Patented Sept. 1, 1953

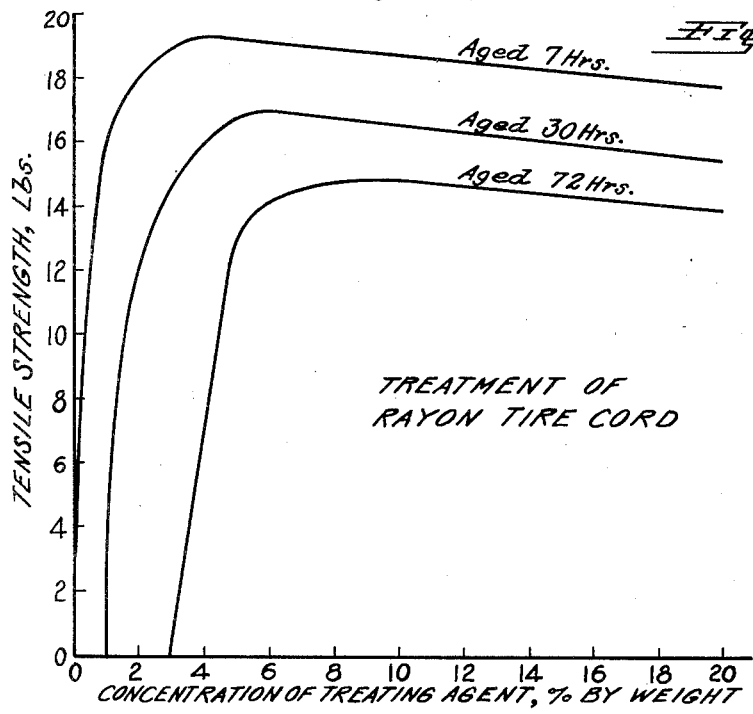
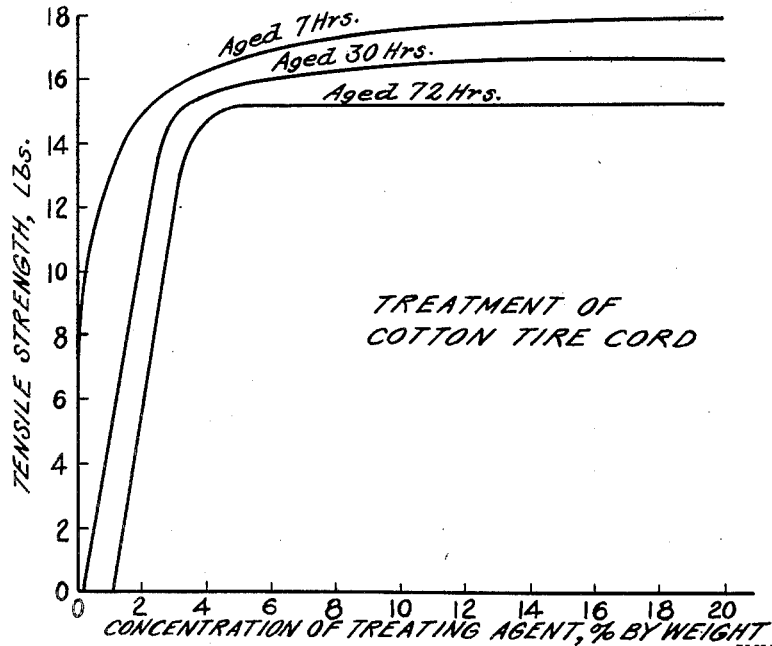

2,650,891

UNITED STATES PATENT OFFICE 2,650,891

PROTECTION OF CELLULOSE AGAINST HEAT AGING

Howard M. Buckwalter, Detroit, Mich., assignor to United States Rubber Company, New York, N. Y., a corporation of New Jersey Application April 13, 1951, Serial No. 220,946

17 Claims. (Cl. 154—46)

This invention relates to the protection of cellulose against heat aging, and more particularly it relates to a method of preventing the progressive irreversible loss of strength which occurs in cellulose when it is subjected to elevated temperatures for a prolonged period of time, as well as to improved cellulose articles produced by such treatment.

Ordinarily, when cellulose is subjected to elevated temperature, e. g., temperatures in excess of about 125° C., there occurs a slow but progressive unfavorable pyrolytic reaction which results in the gradual loss of desirable physical properties, especially tensile strength. This thermal deterioration has in the past placed a definite limitation on the length of service that could be expected from cellulose articles at elevated temperatures. The problem has been particularly acute in those applications where cellulose in the form of fibers has been employed as reinforcement for rubber articles, such as pneumatic tires, steam hose, power transmission belts, conveyor belts, etc. These articles are commonly exposed to elevated temperature in use, either because they are subjected to external heating, or because they generate heat within themselves by reason of repeated rapid flexing, as in the case of pneumatic tires. The gradual thermal degradation of the cellulose fiber reinforcement in such articles leads eventually to breakage of the reinforcement, with consequent failure of the article. This deteriorating action of prolonged heating on cellulose is a principal cause of failure of such articles as pneumatic tires and steam hose.

Accordingly, it is a principal object of the present invention to provide a method for protecting cellulose, especially cellulose in the form of fiber, such as cotton or rayon strands, yarns, cords or fabric, from thermal degradation. Another object is the provision of articles of manufacture embodying cellulose reinforcement protected against deterioration by heat aging. It is still another object of the invention to provide improved cellulose fibers themselves, whether unstranded, stranded, or in the form of fabric, and especially to provide vulcanized rubber articles reinforced with such cellulose fibers, such as pneumatic tire casings reinforced therewith. The foregoing objects, and additional objects and advantages of the invention, will more fully hereinafter appear.

In the accompanying drawing:

Fig. 1 is a graph showing the tensile strength of rayon tire cord treated in accordance with the invention, plotted as a function of the concentration of the treating agent; and Fig. 2 is a similar graph for cotton tire cord.

The invention contemplates the protection of cellulose against deterioration by heat aging by incorporating therein a water soluble 2,2'-diaminodialkylsulfide. I have unexpectedly discovered that the water soluble 2,2'-diaminodialkylsulfides are highly effective for imparting to cellulose the ability to withstand degradation by the action of heat over extended periods of time.

In practicing the invention, the 2,2'-diaminodialkylsulfide may be applied to the cellulose in any convenient manner, for example, by immersing the cellulose to be treated in a solution, usually an aqueous solution, of the 2,2'-diaminodialkylsulfide for a period of time sufficient for the cellulose to imbibe the 2,2'-diaminodialkylsulfide, and to become substantially impregnated therewith.

The cellulose is usually employed in the form of fiber, such as ordinary grey cotton fiber, although the process of the invention may be employed with equal advantage with the various regenerated cellulose fibers, such as viscose rayon, or with regenerated cellulose in non-fibrous form, such as in sheet form. The invention is applicable to native cellulose fibers in general, such as flax, hemp, etc., as well as to scoured, bleached and mercerized cotton, or to fibers treated with alkali-metal abietate or congoplate as disclosed in U. S. Patents 2,297,536 and 2,422,078 respectively. In place of immersing the cellulose in the treating solution, I may incorporate the 2,2'-diaminodialkylsulfide in the cellulose in any other suitable manner, such as by spraying or brushing.

The 2,2'-diaminodialkylsulfides which I employ in my invention are those which are water soluble and which are therefore readily imbibed by the hydrophilic cellulose. The 2,2'-diaminodialkylsulfides having the desired water solubility are those in which the alkyl groups are lower alkyl groups, viz., alkyl groups having six carbon atoms or less. 2,2'-diaminoethylsulfide is preferred because of its ready solubility in water, its ease of preparation, its economy, and its effectiveness. This compound has the structural formula

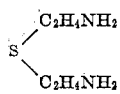

and is a water soluble liquid having a boiling point of 231–33° C. It may be prepared, for example, by reacting ethyleneimine with hydrogen sulfide (Gabriel and Eschenbach; Ber. 30 2497). The 2,2'-diaminodialkylsulfides having higher alkyl groups than 2,2'-diaminodiethylsulfide, such as 2,2'-diaminodihexylsulfide, are less preferred.

The treatment with the 2,2'-diaminodialkylsulfide may be carried out at room temperature if desired, or at elevated temperatures, for example, up to and including the boiling point of the aqueous or other solution of the treating chemical. The time of contact between the cellulose material and the treating chemical should be sufficient to permit substantial penetration of the fiber. Usually treatments of 5 seconds to 2 minutes duration are adequate for this purpose.

When the treating chemical is employed as a solution the concentration of the treating chemical is generally preferably within the range of from about 2% to about 10% by weight, although remarkable improvement in heat resistance of the cellulose is frequently observed when the concentration of the 2,2'-diaminodialkylsulfide is as little as 0.2% in the treating solution. If desired, more concentrated solutions may be employed, e. g., a 20% solution; or an even more concentrated solution, although there is ordinarily only minor advantage in using solutions appreciably more concentrated than about 5 or 10%. When the cellulose is contacted with such a solution of the treating chemical the treating chemical diffuses into and is imbibed within the cellulose, and is thereby deposited throughout the interior structure of the cellulose in molecular contact with the cellulose molecules.

In order to obtain the benefits of the treatment of the invention it is essential that the 2,2'-diaminodialkylsulfide remain in the cellulose and be actually present as such in the cellulose at the time the cellulose is subjected to the heating which would ordinarily cause deterioration. In order to impart effective protection against thermal degradation of the cellulose, only a minor amount of the treating agent need be present therein. For example, 2,2'-diaminodiethylsulfide present in amount of as little as 1% by weight of the treated cellulose produces a definite improvement. Typically, the treatment according to the invention will result in the deposition of from about 1% to 6% by weight of the treating chemical, based on the weight of the treated cellulose, although greater amounts of the treating chemical are ordinarily without deleterious effect on the cellulose, and there is no critical limitation on the upper concentration of the treating chemical which may be present in the cellulose.

The following examples will illustrate the practice of my invention in more detail.

EXAMPLE 1

Rayon tire cords were immersed in a boiling aqueous solution of 2,2'-diaminodiethylsulfide of various concentrations for a period of 2 minutes, as a result of which the cord imbibed definite amounts of 2,2'-diaminodiethylsulfide. The cords were then removed from the solution, and the excess solution was allowed to drain off. The cords were then dried at 110° C. The cords were then conditioned to contain 10–11% moisture and thereafter aged by heating in a sealed tube at 165° C. for varying periods of time. This procedure is known as sealed tube aging and represents an aging sufficiently severe to cause marked, accelerated, progressive, permanent loss of strength. It has been found that tensile strength changes which occur under sealed tube aging conditions provide a highly reliable index to the heat resisting properties of the treated fibers when heat aged in rubber and plastic compositions, and therefore sealed tube aging is a valuable method for indicating how the treated cord will behave when embedded in rubber in the form for example, of a tire carcass.

After the sealed tube aging period, the tensile strength of the treated rayon cords was determined at 70° F. and 60% relative humidity with the results shown in the following table:

Treatment of rayon tire cord

| Concentration of 2,2'-diaminodiethylsulfide in treating solution, Percent by weight | Time Aged at 165° C., Hrs. | Tensile Strength of Treated Cord, Lbs. | Relative Strength Compared to Untreated Unaged Control, Percent | Relative Strength Compared to Untreated Aged Control, Percent |
|---|---|---|---|---|
| 0 (Control) | 0 | 21.0 | 100 | |
| 0 (Control) | 7 | 3.2 | 15 | 100 |
| 0 (Control) | 30 | 0.0 | | |
| 0 (Control) | 72 | 0.0 | | |
| 1 | 7 | 16.2 | 77 | 507 |
| 1 | 30 | 0.0 | | |
| 1 | 72 | 0.0 | | |
| 3 | 7 | 19.3 | 92 | 604 |
| 3 | 30 | 14.4 | 69 | |
| 3 | 72 | 0.0 | | |
| 5 | 7 | 18.8 | 90 | 587 |
| 5 | 30 | 17.0 | 81 | |
| 5 | 72 | 13.7 | 65 | |
| 10 | 7 | 18.9 | 90 | 591 |
| 10 | 30 | 16.6 | 79 | |
| 10 | 72 | 14.8 | 70 | |
| 20 | 7 | 17.5 | 83 | 547 |
| 20 | 30 | 15.5 | 74 | |
| 20 | 72 | 13.9 | 66 | |

The results are also shown graphically in Fig. 1, which is a plot of the concentration of 2,2'-diaminodiethylsulfide in the treating solution on a horizontal axis against the tensile strength of the cord on a vertical axis, plotted for 7 hours, 30 hours, and 72 hours sealed tube heat aging. It will be evident from inspection of the table and Fig. 1, that the 2,2'-diaminodiethylsulfide was highly effective in imparting to the rayon cord a substantial resistance to heat deterioration. The cord treated with a 3% solution of the 2,2'-diaminodiethylsulfide retained over 90% of its original tensile strength after 7 hours aging, and was more than 6 times as strong as a similarly aged untreated cord. It will be noted that there is a sharp rise in the tensile strength of the aged cord with increasing concentrations of diaminodiethylsulfide. It will also be noted that the optimum concentration advanced with increasing severity of the aging conditions. For the less severe 7 hour aging test at 165° C., the optimum concentration was about 2–2.5%; for the more severe 72 hour test, it was about 5–6%.

EXAMPLE 2

The foregoing experiment was repeated, employing gray cotton tire cord in place of rayon tire cord. The results are indicated in the following table:

*Treatment of cotton tire cord*

| Concentration of 2,2'-diaminodiethylsulfide in treating solution, Percent by weight | Time Aged at 165° C., Hrs. | Tensile Strength of Treated Cord, Lbs. | Relative Strength Compared to Untreated Unaged Control, Percent | Relative Strength Compared to Untreated Aged Control, Percent |
|---|---|---|---|---|
| 0 (Control) | 0 | 16.6 | 100 | |
| 0 (Control) | 7 | 4.9 | 30 | 100 |
| 0 (Control) | 30 | 0.0 | 0 | 0 |
| 0 (Control) | 72 | 0.0 | 0 | 0 |
| 1 | 7 | 13.2 | 80 | 270 |
| 1 | 30 | 5.8 | 35 | |
| 1 | 72 | 0.0 | 0 | |
| 3 | 7 | 16.0 | 96 | 326 |
| 3 | 30 | 15.4 | 93 | |
| 3 | 72 | 13.2 | 80 | |
| 5 | 7 | 16.5 | 99 | 337 |
| 5 | 30 | 15.9 | 96 | |
| 5 | 72 | 15.2 | 92 | |
| 10 | 7 | 17.4 | 105 | 355 |
| 10 | 30 | 16.7 | 100 | |
| 10 | 72 | 15.2 | 92 | |
| 20 | 7 | 18.0 | 108 | 367 |
| 20 | 30 | 16.6 | 100 | |
| 20 | 72 | 15.3 | 92 | |

The results are shown graphically in Fig. 2 in the same manner as previously, and the marked improvement obtained as a result of the 2,2'-diaminodiethylsulfide will be evident from inspection of the table and the graph. The treated cord, after seven hours aging, was greater than two or three times as strong as the untreated cord similarly aged.

From the foregoing it is evident that the invention provides a method of treating cellulose, whether in the form of fiber such as gray cotton fibers or other forms of cellulose such as regenerated cellulose, either in the form of nonfibrous sheets, or in the form of fibers, whereby the resistance of the cellulose to the deteriorating effect of prolonged exposure to elevated temperatures is substantially enhanced. Thus, the improved cellulose articles of this invention containing a 2,2'-diaminodialkylsulfide are capable of improved serviceability, especially when employed in the form of fibers for such purposes as reinforcing tires, steam hose, and similar rubber-fiber composite articles, which normally have a limited service life because of the deteriorating action of heat on the fiber reinforcement therein. The 2,2'-diaminodialkylsulfide treated fiber can be encased in rubber which may be subsequently vulcanized at elevated temperatures to a dense, strong product without any adverse effects due to the presence of the treating chemical. This is in contrast to certain other chemicals previously proposed for improving the heat age resistance of rayon cords and the like, but which are impracticable because they decompose at vulcanizing temperatures with a liberation of gases, causing blowing in the carcass assembly. Because the 2,2'-diaminodialkylsulfide is comparatively stable at vulcanizing temperatures it retains its chemical identity and remains in the fiber, and is available for protecting the fiber on subsequent exposure of the vulcanized articles to high temperature conditions over extended periods of service.

The 2,2'-diaminodialkylsulfide is not decomposed or removed by temperatures ordinarily employed in drying or baking tire cord after the cord, usually in the form of a weft fabric, has been treated with rubber latex compositions.

As indicated previously, the 2,2'-diaminodialkylsulfide must actually remain as such in the cellulose and be present while the cellulose is exposed to elevated temperature service conditions in order to obtain the beneficial effects of the treatment. In this respect, my treatment differs from certain conventional treatments, particularly treatments designed to obviate the temporary, reversible loss of tensile strength observed in gray cotton fibers when heated at elevated temperatures. Such temporary loss of tensile strength occurs substantially instantaneously upon heating to elevated temperature, and the cotton regains its original strength upon cooling to room temperature. Such temporary reversible loss of tensile strength at elevated temperature is obviated in the prior art methods referred to by removing the waxes from the native cotton, and such treatments are characterized by the fact that it is immaterial whether the treating agent is eventually removed from the cotton or whether the treating agent remains in the cotton. In contrast to this, the present invention is concerned with the slow, progressive irreversible chemical changes which occur in cellulose, whether gray cotton containing natural waxes, or dewaxed cotton, or regenerated cellulose, induced by elevated temperatures, e. g., 125° C. and higher. The desired protection against this form of deterioration is obtained only if the 2,2'-diaminodialkylsulfide is preserved as such in the treated fiber, preferably in amount of from 1 to 6% on the weight of the fiber, and therefore it is undesirable to wash or extract the treated cellulose with solvents in a manner which would substantially remove the treating chemical, or to treat the cellulose with any chemical which would react with the 2,2'-diaminodialkylsulfide so as to change its chemical identity and make it ineffective for its purpose.

While I have described my invention with particular reference to a preferred treatment of cellulose fibers intended to be used for reinforcing rubber articles, it will be understood that the improved 2,2'-diaminodialkylsulfide containing cellulose of this invention is susceptible of many other uses where resistance to heat is a desirable characteristic. However, the improved cellulose fibers of the invention are especially adapted to production of vulcanized rubber-fabric composite articles, because the 2,2'-diaminodiethylsulfide has no deleterious effect on the vulcanization, and the 2,2'-diaminodiethylsulfide resists vulcanizing temperatures, thereby resulting in improved vulcanized rubber-fabric composite articles.

Having thus described my invention, what I claim and desire to protect by Letters Patent is:

1. The method of improving the resistance of cellulose to the deteriorating effects of heat aging which comprises incorporating a water soluble 2,2'-diaminodialkylsulfide in the cellulose the said alkyl groups being lower alkyl groups containing less than seven carbon atoms.

2. The method as in claim 1 in which the 2,2'-diaminodialkylsulfide is 2,2'-diaminodiethylsulfide.

3. The method of improving the resistance of cellulose fibers to the deteriorating effects of heat aging which comprises impregnating the fibers with an aqueous solution of a 2,2'-diaminodialkylsulfide the said alkyl groups being lower alkyl groups containing less than seven carbon atoms.

4. The method as in claim 3 in which the fibers are gray cotton fibers.

5. The method as in claim 3 in which the fibers are regenerated cellulose fibers.

6. The method as in claim 3 in which the 2,2'-diaminodialkylsulfide is 2,2'-diaminodiethylsulfide.

7. The method of improving the resistance of gray cotton fibers to the deteriorating effects of heat aging which comprises immersing the fibers in an aqueous solution of 2,2'-diaminodiethylsulfide.

8. The method of improving the resistance of regenerated cellulose fibers to the deteriorating effects of heat aging which comprises immersing the fibers in an aqueous solution of 2,2'-diaminodiethylsulfide.

9. Cellulose containing a water-soluble 2,2'-diaminodialkylsulfide the said alkyl groups being lower alkyl groups containing less than seven carbon atoms.

10. A cellulose fiber containing a water-soluble 2,2'-diaminodialkylsulfide distributed throughout its structure the said alkyl groups being lower alkyl groups containing less than seven carbon atoms.

11. A cellulose fiber as in claim 10 in which the 2,2'-diaminodialkylsulfide is 2,2'-diaminodiethylsulfide.

12. A gray cotton fiber containing 2,2'-diaminodiethylsulfide, whereby the resistance of the fiber to the deteriorating effect of heat aging is substantially enhanced.

13. A regenerated cellulose fiber containing 2,2'-diaminodiethylsulfide, whereby the resistance of the fiber to the deteriorating effect of heat aging is substantially enhanced.

14. A vulcanized rubber article reinforced with cellulose fibers containing a water-soluble 2,2'-diaminodialkylsulfide, whereby the resistance of the fibers to the deteriorating effect of heat aging is substantially enhanced the said alkyl groups being lower alkyl groups containing less than seven carbon atoms.

15. A vulcanized rubber article as in claim 14 in which the 2,2'-diaminodialkylsulfide is a 2,2'-diaminodiethylsulfide.

16. A vulcanized rubber article reinforced with gray cotton fibers containing 2,2'-diaminodiethylsulfide.

17. A vulcanized rubber article reinforced with regenerated cellulose fibers containing 2,2'-diaminodiethylsulfide.

HOWARD M. BUCKWALTER.

References Cited in the file of this patent

UNITED STATES PATENTS

| Number | Name | Date |
|---|---|---|
| 2,050,196 | Sebrell | Aug. 4, 1936 |
| 2,131,145 | Schlack | Sept. 27, 1938 |
| 2,346,440 | Lessig | Apr. 11, 1944 |
| 2,468,086 | Latham et al. | Apr. 26, 1949 |